United States Patent [19]

Nakao et al.

[11] Patent Number: 5,718,932
[45] Date of Patent: Feb. 17, 1998

[54] LOW-CALORIE EDIBLE MATERIAL LIKE PATE OR MOUSSE

[75] Inventors: Tokiko Nakao, Enotomarimachi; Takeshi Satake, Tatsuruhamamachi; Yoshito Sugino, Sakujimachi, all of Japan

[73] Assignee: Sugiyo Co., Ltd., Ishikawa, Japan

[21] Appl. No.: 627,063

[22] Filed: Apr. 3, 1996

[30] Foreign Application Priority Data

Apr. 28, 1995 [JP] Japan ................... 7-129232

[51] Int. Cl.$^6$ ............ A23L 1/314; A23L 1/315; A23L 1/317; A23L 1/325
[52] U.S. Cl. ............ 426/104; 426/643; 426/644; 426/646
[58] Field of Search ................... 426/641, 643, 426/644, 646, 574, 104, 573

[56] References Cited

U.S. PATENT DOCUMENTS

| | | | |
|---|---|---|---|
| 4,362,752 | 12/1982 | Sugino et al. | 426/574 X |
| 4,652,455 | 3/1987 | Sugino et al. | 426/643 X |
| 4,676,976 | 6/1987 | Toba et al. | 426/573 X |
| 4,876,103 | 10/1989 | Kawano et al. | 426/646 X |
| 4,978,551 | 12/1990 | Sugino | 426/643 X |
| 5,358,731 | 10/1994 | Sakamoto et al. | 426/646 X |
| 5,422,133 | 6/1995 | Yamamoto et al. | 426/574 X |

FOREIGN PATENT DOCUMENTS

| | | | |
|---|---|---|---|
| 0412188 | 2/1991 | European Pat. Off. | 426/574 |
| 53-47562 | 4/1978 | Japan | 426/643 |
| 57-94279 | 6/1982 | Japan | 426/643 |
| 2-156871 | 6/1990 | Japan | 426/643 |
| 6-22730 | 2/1994 | Japan | 426/643 |
| 6-153831 | 6/1994 | Japan | 426/643 |

OTHER PUBLICATIONS

Kawano, Japanese Patent Abstract 406296472A, Oct. 1994.

*Primary Examiner*—Arthur L. Corbin
*Attorney, Agent, or Firm*—Banner & Witcoff, Ltd.

[57] ABSTRACT

A low-calorie edible material like pâté or mousse, comprising 100 parts by weight of a meat paste containing about 44 to 89% by weight of one or more of fish meat "surimi", poultry meat "surimi" and animal meat "surimi", 30 to 220 parts by weight of a water solution containing 1 to 4% by weight of mannan, 30 to 290 parts by weight of vegetable or animal oil, and a suitable amount of seasoning.

16 Claims, No Drawings

LOW-CALORIE EDIBLE MATERIAL LIKE PATE OR MOUSSE

BACKGROUND OF THE INVENTION

This invention relates to a novel edible material which is made from a meat paste comprising "surimi" of fish, poultry or animal meat and a water solution of mannan. The edible material of the invention is soft and smooth to the touch in the mouth and has flavor and texture similar to pâté or mousse.

Pâté or mousse is well known as a high-grade dish of French cuisine prepared by mixing fish, poultry or animal meat with various seasonings, kneading the mixture, and further adding to the kneaded mixture oil, fat, liver, gelatin, cream, egg white, etc. to produce a mass of paste which feels very subtle and smooth in the mouth when eaten. These foods are prepared while being cooled or spread over other foods so as to be served on a table.

Since the foods contain animal protein such as fish, poultry or animal meat or liver and additionally oil, fat, gelatin, cream and egg white,-they have very high-calories. In the present day of gourmet cooking, these foods are to be taken in to keep health.

Since these kinds of food are likely to be contaminated with putrefactive bacteria in the course of processing it, it is not advisable to make such foods in large quantities for preservation. Indeed, freezing may suppress the growth of putrefactive bacteria and enable preservation for a long time, but it causes denaturation and gelation of the protein and separation of the oil or fat contained in the food, with resulting deterioration of the characteristic flavor and smooth, soft texture of the food and marked reduction of its food value.

In the field of food industry various studies and experiments have been conducted to solve the above problems, which, however, remain unsolved.

In view of the fact that pâté and mousse are made from high-calorie ingredients alone, the present inventors have conducted various studies and experiments to determine if any of the ingredients can be substituted for by any other low-calorie material without deteriorating the flavor, texture and mouthfeel of the foods. Fat or oil added to mashed fish, poultry or animal meat makes the paste clumsy, and separates from the paste. The inventors found that by adding a certain amount of water solution of mannan to the mixture of the paste and oil or fat it is possible to greatly improve the mutual affinity between the paste and oil or fat and obtain a low-calorie food which feels soft and smooth in the mouth and is quite similar to pâté or mousse in flavor and texture.

SUMMARY OF THE INVENTION

The food prepared in accordance with the invention comprises 100 parts by weight of a paste containing 44 to 89% by weight of either one kind of fish meat "surimi", poultry meat "surimi" and animal meat "surimi" or a mixture of two or more of them, 30 to 220 parts by weight of a water solution containing 1 to 4% by weight of mannan powder, 30 to 290 parts by weight of vegetable and/or animal oil, and an appropriate amount of a seasoning.

DETAILED DESCRIPTION OF THE INVENTION

The invention will be described in detail.

The paste of fish, poultry, or animal meat used in the invention contains about 44 to 89% by weight of one or more of fish meat "surimi", poultry meat "surimi" and animal meat "surimi", and common salt and water. The mixing ratio preferably is 100 parts by weight of the meat paste, 2.5 to 3.5 parts by weight of common salt, and 10 to 120 parts by weight of water. To this composition starch may be added to improve the capacity of the paste to retain water and the endurance thereof to freezing. The amount of starch to be added is 0 to 30 parts by weight to 100 parts by weight of the "surimi".

The fish meat "surimi" from which the paste is prepared can be of any type available in the market which is made of cod, sea bream, lizard fish, shark or any other fish meat raw or frozen.

To prepare the fish meat paste a conventional method in the technique of making "kamaboko", a traditional Japanese food made of heat-coagulated fish meat "surimi" and the like, may be employed. To prepare "kamaboko", the fish meat paste is steamed in a steam oven for 20 to 40 minutes or alternatively first stored in a room kept at 15° to 45° C. for 6 to 16 hours and then steamed in a steam oven for 20 to 40 minutes, whereupon a coagulated mass "kamaboko" having a jelly strength of 100 to 1200 g.cm is obtained. The jelly strength is measured by a rheometer (NRM2003J, available from Fudokogyo Co., Ltd.) with a 5mmø plunger.

An example of the method of preparing standard fish meat paste is as follows; 100 parts by weight of frozen high-grade fish meat "surimi" is put into a kneader, to which 40 parts by weight of iced water is added, and the mixture is well kneaded into a uniform paste, to which 3.2 parts by weight of common salt, 6 parts by weight of a seasoning (a mixture of sodium glutamate, sodium inosinate, an amino acid powder made by decomposing protein, etc.), 14 parts by weight of wheat starch, 1.5 parts by weight of beet sugar, a small amount of a condensed phosphate such as polyphosphate, metaphosphate, or pyrophosphate and a small amount of a coloring agent are added, and kneading is continued until 160 parts by weight of standard fish meat paste is obtained. This paste is suitable for use in the invention.

To prepare poultry meat paste that portion of poultry meat which contains little fat may be used as a raw material. An amount of minced poultry meat of such quality is put into a kneader, to which iced water and common salt are added and the mixture is roughly kneaded. Then iced water and common salt are added to the roughly kneaded mixture, which is well kneaded. To the well-kneaded mixture a seasoning, starch and, if needed, a condensed phosphate are added and further kneaded until a uniform mass of paste is obtained.

An example of the method of preparing standard poultry meat paste is as follows: 100 parts by weight of minced white chicken meat is put into a kneader, to which 4 parts by weight of iced water and 1 (one) part by weight of common salt are added, and the mixture is roughly kneaded to obtain 105 parts by weight of roughly kneaded poultry meat "surimi". 100 parts by weight of the roughly kneaded poultry meat "surimi" is put into a kneader, to which 40 parts by weight of iced water is added and well kneaded until a mass of uniform paste is obtained. To the well-kneaded paste 3.2 parts by weight of common salt, 6 parts by weight of a seasoning (which is a mixture of sodium glutamate, sodium inosinate, an amino acid powder, etc.), 14 parts by weight of wheat starch, 1.5 parts by weight of beet sugar, a small amount of a condensed phosphate and a small amount of a coloring agent are successively added and kept being kneaded until 160 parts by weight of standard poultry meat paste is obtained. This poultry meat paste is suitable for use in the invention.

To prepare animal meat paste beef or pork may be used, and lean meat containing little fat is particularly suitable for the invention. An amount of lean meat is minced, and the minced mass is sieved to remove aponeuroses and tendons therefrom so as to give the final product good taste and texture. The succeeding steps to be taken are similar to those taken to prepare the poultry meat paste.

An example of the method of preparing standard animal meat paste is as follows: an amount of imported lean beef is minced and sieved to remove aponeuroses and tendons to obtain a minced mass of beef. 100 parts by weight of the minced beef is put into a kneader, to which 20 parts by weight of iced water and 1 (one) part by weight of common salt are added and kneaded to obtain 120 parts by weight of beef "surimi". Then 100 parts by weight of the beef "surimi" is put into a kneader, to which 40 parts by weight of iced water is added, and the mixture is kneaded until a mass of uniform paste is obtained. Then 3.2 parts by weight of common salt, 6 parts by weight of a seasoning (which is a mixture of sodium glutamate, sodium inosinate, amino acid powder, etc.), 14 parts by weight of wheat starch, 1.5 parts by weight of beet sugar, a small amount of a condensed phosphate and a small amount of a coloring agent are successively weighed and added to the above paste while the mixture is kept being kneaded. Kneading is continued until 160 parts by weight of standard beef paste is obtained. This paste is suitable for use in the invention.

Mannan powder commercially available for making devil's tongue jelly or "konnyaku" in Japanese can be used as raw material for producing the food of the invention. It is also possible to use refined mannan powder prepared by adding an organic solvent such as alcohol to a water Solution of mannan powder to cause mannan to precipitate and drying the precipitate to obtain mannan powder from which the components of lower molecular weights have been removed.

Generally, a water solution of the refined mannan powder has a viscosity 1.3 to 1.5 times that of a water solution of "konnyaku" mannan powder.

In accordance with the invention, in view of the efficiency of the work of soaking mannan powder with water and the viscosity of the fish, poultry or animal meat paste with which the mannan solution is to be mixed, a water solution of mannan containing 1.0 to 4.0% by weight of the above mannan powder is advantageously used.

The amount of mannan solution preferably is about 30 to 220 parts by weight to 100 parts by weight of the fish, poultry or animal meat paste. If the amount is less than about 30 parts by weight, the mixture contains crumbs of the materials like "kamaboko" and cannot obtain good shape retention. If the amount exceeds about 220 parts by weight, the mixture increases in sliminess and decreases in shape retention.

Any known method of soaking mannan powder with water may be employed to prepare a water solution of mannan powder. For example, a required amount of mannan powder is put little by little into a required amount of water being violently stirred so as to be dispersed in the water, and the solution is left as it is for about 3 hours to make the mannan sufficiently soaked with water so that a mass of viscous mannan paste is obtained.

In the step of preparing the mannan solution, starch such as cornstarch, waxy starch, wheat starch, or a modified starch such as phosphatized, esterified or bridge-bonded starch may advantageously be added to the mannan solution so as to be uniformly dispersed therein thereby to improve the capacity of the final product to retain water and the durability thereof to freezing. The amount of starch to be added which is effective in improving the above capacity and durability is 5 to 15% by weight of the mannan solution.

An example of the method of preparing standard mannan solution is as follows: 5,000 parts by weight of water kept at 20° C. is put in a container provided with a stirrer. While the water is being violently stirred, 100 parts by weight of mannan powder (available under the tradename of "Propol" from Shimidzu Chemical Co., Ltd.) and 408 parts by weight of a modified starch (available under the tradename of "Thermtex" from National Starch & Chemical Company) are gradually added to the water, which is kept being stirred for 20 minutes to make the mannan powder well dispersed in the water, and then left as it is for 3 hours. Then the solution is stirred for 30 minutes to obtain 5500 parts by weight of standard mannan solution suitable for use in the invention.

Oil or fat is added to give the product a texture which not only feels soft and mellow in the mouth when eaten but also can retain foams therein. The oil or fat is preferably liquid at room temperature. For example, one or more of soybean oil, rapeseed oil, cottonseed oil, or palm oil may be used.

When solid oil or fat such as suet or lard is used, it is advisable not to use it alone but to use it mixed with one or more of the above-mentioned vegetable oils so as to give the product good flavor, taste and texture. The amount of oil or fat to be added is about 30 to 290 parts by weight to 100 parts by weight of the above-mentioned paste. Within this range the oil or fat will not be separated from the paste when mixed with the paste together with the mannan solution. If the amount is less than about 30 parts by weight, the product will not become thixotropically creamy. If the amount exceeds 290 parts by weight, the oil or fat will separate from the other components of the product.

When the oil or fat is mixed with the paste and the mannan solution, a food emulsifier such as lecithin, sucrose-fatty acid ester, or glycerin-fatty acid ester, an emulsion-stabilizing agent such as sodium metaphosphate or sodium diphosphate, and a texturing agent such as starch or guar gum may be added in suitable amounts to improve the flavor, taste and texture of the final product.

To mix the above-mentioned paste, mannan solution and oil or fat, a device such as a kneader or food cutter is used for making the materials into a uniform paste. With a dearator attached to the device it is possible to improve the smoothness and uniformity of the texture of the product.

The following experiments were conducted to test the mutual affinity between the fish meat paste and oil or fat.

Twelve samples numbered 1-1 through 1-6 and 2-1 through 2-6 were prepared in the following manner: 1 (one) kg of the standard fish meat paste prepared in the previously described manner was put into each of 6 (six) food cutters, to which 0.05, 0.10, 0.15, 0.20, 0.25 and 0.30 kg of soybean oil were added respectively. The mixture in each of the cutters was well kneaded into a mass of uniform paste, which was put into a steamer and steamed for 30 minutes to form a heat-coagulated mass. The mass was cooled down to room temperature, and one half of the mass was again put into the food cutter so as to be rendered pasty and stored at 15° C. for 48 hours.

The other half of the mass was stored in a refrigerator kept at −25° C. for 48 hours and again put into the food cutter so as to be rendered pasty and stored at 15° C. for 48 hours.

The results of the experiments are given in Tables 1 and 2.

TABLE 1

Affinity between fish meat paste and oil (samples stored at 15° C.).

| Sample No. | Oil Amount added (kg) | Oil Mixing ratio (%) | Observation |
|---|---|---|---|
| 1-1 | 0.30 | 23.1 | Crumbly and not massed, with much oil separated. |
| 1-2 | 0.25 | 20.0 | Crumbly and not massed, with much oil separated. |
| 1-3 | 0.20 | 16.7 | Crumbly and not massed, with some oil separated. |
| 1-4 | 0.15 | 13.0 | Crumbly, with a little oil separated. |
| 1-5 | 0.10 | 9.1 | Highly resistive to mastication and rough in mouth, with grains like "kamaboko". |
| 1-6 | 0.05 | 4.8 | Highly resistive to mastication and rough in mouth, with grains like "kamaboko". |

(Amount of fish meat paste: 1.0 kg)

TABLE 2

Affinity between fish meat paste and oil (samples stored at 15° C. after having been frozen at −25° C).

| Sample No. | Oil Amount added (kg) | Oil Mixing ratio (%) | Observation |
|---|---|---|---|
| 2-1 | 0.30 | 23.1 | Crumbly and not massed, with much oil separated. |
| 2-2 | 0.25 | 20.0 | Crumbly and not massed, with much oil separated. |
| 2-3 | 0.20 | 16.7 | Crumbly and not massed, with some oil separated. |
| 2-4 | 0.15 | 13.0 | Crumbly, with a little oil separated. |
| 2-5 | 0.10 | 9.1 | Highly resistive to mastication, with grains elastic like "kamaboko" and oil separated on surface. |
| 2-6 | 0.05 | 4.8 | Highly resistive to mastication, and rough in mouth, with grains like "kamaboko". |

(Amount of fish meat paste: 1.0 kg)

As shown in Tables 1 and 2, in Sample Nos. 1-1 to 1-4 and 2-1 to 2-5 which contain oil in an amount of more than 10% of the amount of the standard fish meat paste, no separation of oil was observed, and as the amount of oil increased, the amount of separated oil increased. The samples containing a relatively small amount of oil were resiliently resistive to mastication like "kamaboko", and the samples containing a relatively large amount of oil crumbled and felt coarse or rough in the mouth. The mixture was not a soft, creamy paste.

The following experiments were conducted to test the mutual affinity between the mannan solution and oil.

Six samples numbered 3-1 through 3-6 were prepared in the following manner: Six kinds of mannan solution containing 1.0, 1.5, 2.0, 2.5, 3.0 and 3.5% by weight of mannan powder were prepared. 300 g of the solution of each of the six mannan concentrations was put into a food cutter, to which soybean oil was gradually added while the solution was being stirred. The oil was added in the very amount which keeps the mannan solution and soybean oil uniformly mixed and in stable, creamy condition and beyond which the added oil begins to be separated from the mixture. The critical amounts recorded for the samples are given in Table 3.

TABLE 3

The affinity between mannan solution and oil.

| Sample No. | Concentration of mannan (%) | Amount of oil added (g) | Mixing ratio of oil (%) |
|---|---|---|---|
| 3-1 | 1.0 | 517 | 63.3 |
| 3-2 | 1.5 | 150 | 33.3 |
| 3-3 | 2.0 | 150 | 33.3 |
| 3-4 | 2.5 | 102 | 25.4 |
| 3-5 | 3.0 | 80 | 21.5 |
| 3-6 | 3.5 | 69 | 18.7 |

The experiments previously conducted to test the affinity between the standard fish meat paste and oil confirmed the experience that when oil is added to a mixture containing proteins and much water, water and oil are separated from the mixture. It has been confirmed by the above experiments that mannan solution and oil have good mutual affinity and form a stable thixotropic creamy paste.

The amount of oil to be added ranges widely from 18.7 to 63.3% by weight, and the concentration of mannan of the solution necessarily determines the amount of oil to be added.

To test the mutual affinity between the standard fish, poultry and animal meat pastes and the mannan solution the following experiments were conducted, with the previously described standard fish meat paste taken as an example.

Fourteen (14) samples numbered 4-1 through 4-7 and 5-1 through 5-7 were prepared in the following manner: 100 parts by weight of the previously described standard fish meat paste was put into each of seven (7) food cutters, to which 25, 50, 100, 150, 200, 250 and 300 parts by weight of a water solution containing 2% by weight of mannan powder were added and well mixed to produce seven (7) masses of uniform paste, which were steamed in a steam oven for 40 minutes and cooled down to room temperature.

One half of each of the seven masses was again put into a food cutter so as to be rendered uniformly pasty and stored at room temperature for 48 hours.

The other half of each of the seven masses was frozen in a freezer kept at −25° C. and then stirred by a food cutter to form a mass of uniform paste, which was stored at room temperature for 48 hours.

The results of observation of the samples after 48 hours are given in Table 4 (showing the samples stored at 15° C. after having been frozen at −25° C.) and Table 5 (showing the samples stored at 15° C.).

TABLE 4

The affinity between the fish meat paste and mannan solution (the samples stored at 15° C. after having been frozen at −25° C.).

| Sample No. | Amount of mannan added (parts by weight) | Observation |
|---|---|---|
| 4-1 | 25 | Containing rough grains and lacking softness. |
| 4-2 | 50 | Slightly hard, but pasty. Good shape retention. |
| 4-3 | 100 | Soft paste like mousse. Good shape retention. |
| 4-4 | 150 | Soft paste like mousse. Good shape retention. |
| 4-5 | 200 | Soft paste like mousse. Good shape retention. |
| 4-6 | 250 | Soft paste. Mellow like pâté, and spreading well. |
| 4-7 | 300 | Soft, sticky, slimy, and low shape retention. |

(Fish meat paste: 100 parts by weight)

TABLE 5

The affinity between the fish meat paste and mannan solution (the samples stored at 15° C.).

| Sample No. | Amount of mannan added (parts by weight) | Observation |
|---|---|---|
| 5-1 | 25 | Containing rough grains and lacking softness. |
| 5-2 | 50 | Slightly hard, but pasty. Good shape retention. |
| 5-3 | 100 | Soft like mousse. Good shape retention. |
| 5-4 | 150 | Soft paste like mousse. Good shape retention. |
| 5-5 | 200 | Soft paste like mousse. Good shape retention. |
| 5-6 | 250 | Soft paste. Mellow like pâté, and spreading well. |
| 5-7 | 300 | Soft, sticky, slimy, and low shape retention. |

(Fish meat paste: 100 parts by weight)

As shown in Tables 4 and 5, samples No. 4-1 and 5-1 containing 25 parts by weight of the mannan solution included coarse grains elastic like "kamaboko" (a traditional heat-coagulated fish paste in Japan) intermingled with the mannan solution. They had little or no shape retention and felt rough in the mouth when eaten.

Samples No. 4-2 to 4-4 and 5-2 to 5-4 containing 50, 100 and 150 parts by weight of the mannan solution, respectively, were appropriately soft and pasty like mousse as the amount of the mannan solution added increased. The samples had good shape retention, and after having been formed into different shapes, they were stored at room temperature for 24 hours, whereupon their shapes and the oral sensation they gave remained the same as before.

Samples No. 4-5, 4-6, 5—5 and 5-6 containing 200 and 250 parts by weight of the mannan solution were a little too smooth and soft, spread like butter on crackers, and gave an oral sensation or mouthfeel similar to pâté.

Samples No. 4-7 and 5-7 containing 300 parts by weight of the mannan solution were sticky and slimy and had a slightly low shape retention.

The samples which were frozen and then formed into paste were a little superior in smoothness to the samples which were formed into paste without having been frozen before. There was, however, no marked difference in the oral sensation with respect to softness and other qualities between the two categories of the samples.

To test the mutual affinity between the standard fish, poultry and animal meat paste and the mannan solution mixed with oil and made creamy, the following experiments were conducted, with the previously described standard fish meat paste taken as an example.

Twelve (12) samples numbered 6-1 to 6-6 and 7-1 to 7-6 were prepared in the following manner: 100 parts by weight of the previously described fish meat paste was put into each of six (6) food cutters, to which 50, 100, 150, 200, 250 and 300 parts by weight, respectively, of the creamy mannan paste of sample No. 3—3 in Table 3 (prepared by gradually adding 150 g of soybean oil to a mannan solution containing 2.0% by weight of mannan powder to an oil content of 33.3%) were added and well mixed to produce six (6) masses of uniform paste, which were steamed in a steam oven for 40 minutes and then cooled down to room temperature.

One half of each of the six masses cooled down was again put into a food cutter and well stirred to form a mass of uniform paste, which was stored at room temperature for 48 hours.

The other half of each of the seven masses was frozen in a freezer kept at −25° C. and again stirred by a food cutter to form a mass of uniform paste, which was stored at room temperature for 48 hours.

The results of observation of the samples after 48 hours are given in Table 6 (showing the samples stored at 15° C.) and Table 7 (showing the samples stored at 15° C. after having been frozen at −25° C.).

TABLE 6

The affinity between the fish meat paste and creamy mannan paste (the samples stored at 15° C.).

| Sample No. | Amount of mannan added (parts by weight) | Observation |
|---|---|---|
| 6-1 | 50 | Slightly hard, but pasty. Good shape retention. |
| 6-2 | 100 | Soft paste like mousse. Good shape retention. |
| 6-3 | 150 | Soft paste like mousse. Good shape retention. |
| 6-4 | 200 | Soft paste like mousse. Good shape retention. |
| 6-5 | 250 | Soft paste. Mellow like pâté, and spreading well. |
| 6-6 | 300 | Spreadable like pâté and glossy on surface, and low shape retention. |

(Fish meat paste: 100 parts by weight)

TABLE 7

The affinity between the fish meat paste and creamy mannan paste (the samples stored after having been frozen).

| Sample No. | Amount of mannan added (parts by weight) | Observation |
|---|---|---|
| 7-1 | 50 | Slightly hard, but pasty. Good shape retention. |

TABLE 7-continued

The affinity between the fish meat paste and creamy mannan paste (the samples stored after having been frozen).

| Sample No. | Amount of mannan added (parts by weight) | Observation |
|---|---|---|
| 7-2 | 100 | Soft paste like mousse. Good shape retention. |
| 7-3 | 150 | Soft paste like mousse. Good shape retention. |
| 7-4 | 200 | Soft paste like mousse. Good shape retention. |
| 7-5 | 250 | Soft paste. Mellow like pâté, and spreading well. |
| 7-6 | 300 | Spreadable like pâté and glossy on surface, and low shape retention. |

(Fish meat paste: 100 parts by weight)

As shown in Tables 6 and 7, the samples were soft, uniform paste without oil having been separated. Compared with the previously described samples in Tables 4 and 5 prepared to test the affinity between the fish meat paste and the mannan solution, the samples in Tables 6 and 7 increased in smoothness, had glossy cut surfaces, and gave an oral sensation more like mousse.

To test the affinity between oil and the mixture of fish meat paste and mannan solution, the following experiments were conducted.

Six (6) samples numbered 8-1 through 8-6 were prepared in the following manner: 100 parts by weight of the previously described standard fish meat paste were put into each of six (6) food cutters, to which 200 parts by weight of mannan solutions containing 1.0, 1.5, 2.0, 2.5, 3.0 and 3.5% by weight of mannan powder, respectively, were added and well mixed to produce six masses of uniform paste. While the masses were being stirred, soybean salad oil was added to each of the masses in such an amount that the oil added was retained stably in the mass. The masses of uniform paste obtained were steamed in a steam oven for 40 minutes and then cooled down to room temperature and again stirred by a food cutter to obtain masses of uniform paste, which were stored at room temperature for 48 hours. The results of observation of the samples after 48 hours are given in Table 8.

TABLE 8

The affinity between oil and the mixture of fish meat paste and mannan solution (the samples stored at 15° C.).

| Sample No. | Concentration of mannan (%) | Amount of mannan solution | Amount of fish meat paste | Amount of oil (g) | Mixing ratio of oil (%) |
|---|---|---|---|---|---|
| 8-1 | 1.0 | 200 | 100 | 292.9 | 49.4 |
| 8-2 | 1.5 | 200 | 100 | 260.7 | 46.5 |
| 8-3 | 2.0 | 200 | 100 | 253.5 | 45.8 |
| 8-4 | 2.5 | 200 | 100 | 238.5 | 44.3 |
| 8-5 | 3.0 | 200 | 100 | 208.0 | 41.0 |
| 8-6 | 3.5 | 200 | 100 | 187.8 | 38.5 |

(Mannan solution and fish meat paste in parts by weight)

The following experiments were conducted in the same manner as mentioned just above except that 200 parts by weight of the standard fish meat paste and 100 parts by weight of the mannan solutions of the above-mentioned six mannan concentrations were used. The results are shown in Table 9.

TABLE 9

The affinity between oil and the mixture of fish meat paste and mannan solution (the samples stored at 15° C.).

| Sample No. | Concentration of mannan (%) | Amount of mannan solution | Amount of fish meat paste | Amount of oil (g) | Mixing ratio of oil (%) |
|---|---|---|---|---|---|
| 9-1 | 1.0 | 100 | 200 | 380.1 | 55.9 |
| 9-2 | 1.5 | 100 | 200 | 313.4 | 51.1 |
| 9-3 | 2.0 | 100 | 200 | 205.0 | 40.6 |
| 9-4 | 2.5 | 100 | 200 | 282.6 | 48.5 |
| 9-5 | 3.0 | 100 | 200 | 259.8 | 46.5 |
| 9-6 | 3.5 | 100 | 200 | 240.6 | 44.5 |

(Mannan solution and fish meat paste in parts by weight).

The samples in Tables 8 and 9 except Nos. 8-1 and 9-1 retained much more oil than the fish meat paste alone or the mannan solution alone. This is believed to be because the mutual affinity between the fish meat paste and the mannan solution caused the paste and solution to be intimately mixed up before the paste was coagulated by heat and subsequent heating produced a certain complex forming a paste which felt soft and smooth in the mouth when eaten.

The following experiments were conducted to test the effect the concentration of mannan solution on the oral sensation the product gives.

Twelve (12) samples numbered 10-1 through 10-6 and 11-1 through 11-6 were prepared in the following manner: 100 parts by weight of the previously described standard fish meat paste was put into each of six (6) food cutters, to which 150 parts by weight of mannan solutions containing 1.0, 1.5, 2.0, 2.5, 3.0 and 3.5% by weight of mannan powder, respectively, were added and well mixed to produce six (6) masses of uniform paste. While the masses were being stirred, 60 parts by weight of soybean salad oil was added to each of the six masses and well mixed to produce six masses of uniform paste, which were steamed in a Steam oven for 40 minutes and cooled down to room temperature.

One half of each of the six masses cooled down was again put into a food cutter and stirred to form a mass of uniform paste, which was stored at room temperature for 48 hours.

The other half of each of the six masses was frozen in a freezer kept at −25° C. for 48 hours and again stirred by a food cutter to form a mass of uniform paste, which was stored at room temperature for 48 hours.

The results of observation of the samples after 48 hours are given in Table 10 (showing the samples stored at 15° C.) and Table 11 (showing the samples frozen at −25° C. and stored at

TABLE 10

Effect of the concentration of mannan solution on oral sensation (the samples stored at 15° C.).

| Sample No. | Amount of mannan added (parts by weight) | Observation |
|---|---|---|
| 10-1 | 1.0 | A little too soft paste. Good shape retention. |
| 10-2 | 1.5 | Soft and smooth paste. Good shape retention. |
| 10-3 | 2.0 | Soft and smooth paste. Good shape retention. |

TABLE 10-continued

Effect of the concentration of mannan solution on oral sensation (the samples stored at 15° C.).

| Sample No. | Amount of mannan added (parts by weight) | Observation |
| --- | --- | --- |
| 10-4 | 2.5 | Soft and smooth paste. Good shape retention. |
| 10-5 | 3.0 | Soft and smooth paste. Good shape retention. |
| 10-6 | 3.5 | Soft and smooth paste. Good shape retention. |

(Fish meat paste: 100 parts by weight; mannan solution: 150 parts by weight; soybean salad oil: 60 parts by weight).

TABLE 11

Effect of the concentration of mannan solution on oral sensation (the samples stored at 15° C. after having been frozen at −25° C.).

| Sample No. | Amount of mannan added (parts by weight) | Observation |
| --- | --- | --- |
| 11-1 | 1.0 | A little too soft paste. Good shape retention. |
| 11-2 | 1.5 | Soft and smooth paste. Good shape retention. |
| 11-3 | 2.0 | Soft and smooth paste. Good shape retention. |
| 11-4 | 2.5 | Soft and smooth paste. Good shape retention. |
| 11-5 | 3.0 | Soft and smooth paste. Good shape retention. |
| 11-6 | 3.5 | Soft and smooth paste. Good shape retention. |

(Fish meat paste: 100 parts by weight; mannan solution: 150 parts by weight; soybean salad oil: 60 parts by weight).

As shown in Tables 10 and 11, samples No. 10-1 and 11-1 were a little too soft, but not so markedly different from the other samples. All of the samples had a soft, smooth oral sensation like mousse.

In accordance with the invention, when fish, poultry or animal meat paste is mixed with oil or fat, an amount of mannan solution is added to the mixture to remarkably increase the mutual affinity between the paste and oil or fat, and by changing the concentration of mannan in the solution without changing the mixing ratio of the paste and oil or fat, it is possible to determine the amount of oil to be mixed with the paste, thereby to produce a food which gives an oral sensation like pâte or mousse. Even if the food is frozen, no oil or fat will be separated. Since much of the high-calorie raw materials is replaced by mannan solution, the product has a relatively low calorie.

The invention will be described further by way of the following examples.

EXAMPLE 1

10 kg of high-grade codfish "surimi" and 5 kg of iced water were put into a kneader, to which 0.3 kg of common salt was added, and the mixture was kneaded into a mass of uniform paste. Then 1.4 kg of wheat flour, 0.1 kg of an amino acid seasoning, 0.15 kg of beet sugar, 0.02 kg of a condensed phosphate, and 0.5 kg of a smoked salmon seasoning are successively added to the above-mentioned mass and kneaded for 10 minutes to produce 17 kg of smooth fish meat paste.

On the other hand, 0.5 kg of mannan powder (available under the tradename "Propol" from Shimidzu Chemical Co., Ltd.) was added little by little to 25 kg of water kept at 20° C. and being violently stirred so that the mannan powder was soaked with water, whereupon stirring was stopped and the solution was left as it was for 2 hours. Then stirring was resumed, and 2 kg of modified starch (available under the tradename of "Thermtex" from National Starch & Chemical Company) was added to obtain 27 kg of viscous uniform mannan solution. 10 kg of the mannan solution obtained was put into a cutter-mixer, to which 15 kg of the fish meat paste previously prepared was added, and the mixture was stirred and mixed to produce 25 kg of mixed paste of the fish meat paste and the mannan solution.

On the other hand, 9 kg of salad oil, 10 kg of water, 0.05 kg of sucrose-fatty acid ester, 0.5 kg of guar gum and 0.1 kg of sodium metaphosphate were mixed up by a homogenizer to produce 19.6 kg of creamy emulsified salad oil. 16 kg of the salad oil obtained was added to and mixed with 25 kg of the previously obtained mixed paste together with suitable amounts of an edible coloring matter and a smoked-salmon essence to obtain 40 kg of prepared food like salmon mousse which felt soft and smooth to the touch in the mouth.

The amounts of the fish meat paste, mannan solution and oil in the final product are 100, about 66.7 and about 49 parts by weight, respectively.

EXAMPLE 2

10 kg of the previously described standard animal meat paste was put into a food cutter, to which a suitable amount of spices (that is, cardamom, allspice and nutmeg) and 0.1 kg of a seasoning having a flavor of grilled meat were added and mixed to produce 10 kg of animal meat paste.

On the other hand, 0.6 kg of mannan powder ("Propol"), 20 kg of water adjusted to 20° C. and 0.3 kg of guar gum were mixed to produce 20 kg of mannan solution whose concentration of mannan powder was 3% by weight.

The mannan solution obtained was put into a food Gutter, to which 10 kg of the animal meat paste previously prepared was added and mixed to produce a mass of uniform paste. In addition, 9 kg of salad oil, 10 kg of water, 0.05 kg of sucrose-fatty acid ester and 0.1 kg of sodium metaphosphate were added to and uniformly mixed with the above-mentioned mass of paste by continuously stirring for 10 minutes to produce 49 kg of prepared food like mousse having a flavor of prepared beef.

The amounts of the animal meat paste, mannan solution and oil in the final product are 100, about 200 and about 90 parts by weight, respectively.

EXAMPLE 3

10 kg of the previously described standard poultry meat paste was put into a food cutter, to which suitable amounts of spices (cardamom and allspice) and 0.2 kg of a seasoning having a flavor of liver were added and mixed to produce 10 kg of poultry meat paste.

On the other hand, 0.3 kg of mannan powder ("Propol"), 20 kg of water adjusted to 20° C. and 0.3 kg of guar gum were mixed to produce 20 kg of mannan solution whose concentration of mannan powder was 1.5% by weight.

The mannan solution obtained was put into a food cutter, to Which 10 kg of the poultry meat previously prepared was added and mixed to produce a mass of uniform paste. In addition, 15 kg of salad oil, 10 kg of water, 0.05 kg of sucrose-fatty acid ester and 0.1 kg of sodium metaphosphate were added to and mixed with the above-mentioned mass of paste by continuous stirring for 10 minutes to produce 55. kg of prepared food like pâte having a flavor of liver.

The amounts of the poultry meat paste, mannan solution and oil in the final product are 100, about 200 and about 150 parts by weight, respectively.

EXAMPLE 4

5 kg of the food prepared in Example 1, 5 kg of the food prepared in Example 2 and 5 kg of the food prepared in Example 3 were formed into 3 cm thick plates, which were stored in a freezer at −25° C. for 48 hours so as to be frozen. After 48 hours each of the frozen plates of the three kinds of food was put in a food cutter and stirred until the temperature of the mass rose to 3° to 5° C.

The three samples felt smoother than they did before having been frozen, and no separation of oil was observed even after storage for a long time.

EXAMPLE 5

The same manner as in Example 1 was followed except that 16 kg of "Topping 500" (the tradename of a product from Fuji Seiyu Co., Ltd.) was used instead of the emulsified salad oil prepared in Example 1 from 9 kg of salad oil, 10 kg of water, 0.05 kg of sucrose-fatty acid ester, 0.5 kg of guar gum and 0.1 kg of sodium metaphosphate.

A prepared food like salmon mousse was obtained which felt soft and smooth in the mouth.

Instead of the mannan powder, "konnyaku" mannan powder may also be used in the above examples in such an amount that its concentration is 1.3 to 1.5 times that of the mannan powder.

Beside the above examples, the samples given in Tables 3 through 11 may also be used to produce prepared low-calorie foods having flavor, taste and texture like pâtéor mousse.

In accordance with the invention, fish, poultry or animal meat paste is mixed with oil or fat through the intermediary of mannan solution, which helps markedly increase the mutual affinity between the paste and oil or fat, so that the product can have flavor, taste and texture like pâtéor mousse giving a soft, smooth mouthfeel. Even when the food is frozen, no oil or fat is separated therefrom, so that it is possible to freeze it for storage, thereby to prevent growth of putrefactive bacteria. Thus, in accordance with the invention, it is possible to obtain a low-calorie prepared food quite similar in flavor, taste and texture to conventional pât éor mousse.

What we claim is:

1. A low-calorie edible material like pâtéor mousse, comprising 100 parts by weight of a meat paste containing about 44 to 89% by weight of one or more of fish meat "surimi", poultry meat "surimi" and animal meat "surimi", 30 to 220 parts by weight of a water solution containing 1 to 4% by weight of mannan, 30 to 290 parts by weight of vegetable or animal oil, and a suitable amount of seasoning.

2. The edible material of claim 1, wherein said meat paste comprises 100 parts by weight of one or more of fish meat "surimi", poultry meat "surimi" and animal meat "surimi", 2.5 to 3.5 parts by weight of common salt and 10 to 120 parts by weight of water.

3. The edible material of claim 2, wherein said meat paste further includes 0 to 30 parts by weight of starch.

4. The edible material of claim 1, wherein said meat paste is prepared by kneading 100 parts by weight of fish meat "surimi" and 40 parts by weight of iced water into a uniform paste; and further kneading the paste together with 3.2 parts by weight of common salt, 6 parts by weight of a seasoning, 14 parts by weight of wheat starch, 1.5 parts by weight of beet sugar, a stabilizing amount of a condensed phosphate and an effective amount of edible coloring agent.

5. The edible material of claim 4, wherein said condensed phosphate is selected from the group consisting of polyphosphate, metaphosphate and pyrophosphate.

6. The edible material of claim 1 wherein said meat paste is prepared by kneading 100 parts by weight of minced white chicken meat together with 4 parts by weight of iced water and 1 part by weight of common salt to obtain 105 parts by weight of roughly kneaded poultry meat "surimi"; kneading 100 parts by weight of said poultry meat "surimi" together with 40 parts by weight of iced water to obtain a mass of uniform paste; and further kneading said uniform paste together with 3.2 parts by weight of common salt, 6 parts by weight of a seasoning, 14 parts by weight of wheat starch, 1.5 parts by weight of beet sugar, a stabilizing amount of a condensed phosphate and an effective amount of a coloring agent.

7. The edible material of claim 8, wherein said condensed phosphate is selected from the group consisting of polyphosphate, metaphosphate and pyrophosphate.

8. The edible material of claim 1, wherein said meat paste is prepared by kneading 100 parts by weight of minced beef together with 20 parts by weight of iced water and 1 part by weight of common salt to obtain 120 parts by weight of beef "surimi"; kneading 100 parts by weight of said beef "surimi" together with 40 parts by weight of iced water to obtain a mass of uniform paste; and further kneading said uniform paste together with 3.2 parts by weight of common salt, 6 parts by weight of a seasoning, 14 parts by weight of wheat starch, 1.5 parts by weight of beet sugar, a stabilizing amount of a condensed phosphate and an effective amount of a coloring agent.

9. The edible material of claim 8, wherein said condensed phosphate is selected from the group consisting of polyphosphate, metaphosphate and pyrophosphate.

10. The edible material of claim 1, wherein said mannan solution further includes 5 to 15% by weight of a starch selected from the group consisting of cornstarch, waxy starch, wheat flour, and a modified starch.

11. The edible material of claim 1, wherein said oil comprises a member or a mixture of two or more members selected from the group consisting of soybean oil, rapeseed oil, cottonseed oil, palm oil, suet and lard.

12. The edible material of claim 1, further including an edible emulsifying agent selected from the group consisting of lecithin, sucrose-fatty acid ester, and glycerin-fatty acid ester.

13. The edible material of claim 1, further including an emulsion-stabilizing agent selected from the group consisting of sodium metaphosphate, sodium diphosphate, sodium pyrophosphate, and sodium polyphosphate.

14. The edible material of claim 1, further including one or more of guar gum, beet sugar and a coloring agent.

15. The edible material of claim 1, wherein the mannan contained in said water solution is selected from the group consisting of refined mannan powder and "konnyaku" mannan powder.

16. The edible material of claim 1, wherein said seasoning comprises a mixture of sodium glutamate, sodium inosinate and amino acid made by decomposing protein.

* * * * *